United States Patent
Panusopone et al.

(10) Patent No.: US 8,750,379 B2
(45) Date of Patent: Jun. 10, 2014

(54) METHOD AND APPARATUS FOR COMPLEXITY-SCALABLE MOTION ESTIMATION

(75) Inventors: Krit Panusopone, San Diego, CA (US); David M. Baylon, San Diego, CA (US); Weiyao Lin, Seattle, WA (US)

(73) Assignee: General Instrument Corporation, Horsham, PA (US)

( * ) Notice: Subject to any disclaimer, the term of this patent is extended or adjusted under 35 U.S.C. 154(b) by 1317 days.

(21) Appl. No.: 12/209,174

(22) Filed: Sep. 11, 2008

(65) Prior Publication Data
US 2010/0061459 A1   Mar. 11, 2010

(51) Int. Cl.
*H04N 7/26* (2006.01)

(52) U.S. Cl.
USPC ........... 375/240.16; 375/240.26; 375/E7.124; 375/240.12; 375/240.24; 375/240.23

(58) Field of Classification Search
USPC ............................. 375/240.12, 240.15, 240.16
See application file for complete search history.

(56) References Cited

U.S. PATENT DOCUMENTS

| | | | | |
|---|---|---|---|---|
| 6,014,181 A | * | 1/2000 | Sun | 348/699 |
| 7,983,341 B2 | * | 7/2011 | Wang | 375/240.16 |
| 2005/0025249 A1 | * | 2/2005 | Zhao et al. | 375/240.24 |
| 2005/0157787 A1 | * | 7/2005 | Yanagihara et al. | 375/240.03 |
| 2008/0013628 A1 | * | 1/2008 | Lu et al. | 375/240.12 |
| 2009/0086816 A1 | * | 4/2009 | Leontaris et al. | 375/240.03 |

OTHER PUBLICATIONS

"Efficient, Robust, and Fast Global Motion Estimation for Video Coding", Dufaux et al; IEEE Transactions on Image Processing, vol. 9, No. 3, Mar. 2000.*

* cited by examiner

*Primary Examiner* — Jason Lee
(74) *Attorney, Agent, or Firm* — Thomas A. Ward

(57) ABSTRACT

Embodiments of the invention generally provide a method and apparatus for complexity-scalable video coding. One embodiment of a method for video coding includes receiving a sequence of one or more video frames, obtaining a budget for the one or more video frames, the budget specifying a maximum number of computations that may be used in performing motion estimation for the one or more video frames, allocating the maximum number of computations among individual ones of the one or more video frames, performing motion estimation in accordance with the allocating, and outputting a motion estimate for the sequence.

16 Claims, 3 Drawing Sheets

METHOD AND APPARATUS FOR COMPLEXITY-SCALABLE MOTION ESTIMATION

FIELD OF THE INVENTION

The present invention generally relates to video encoding, and more particularly relates to motion estimation.

BACKGROUND OF THE INVENTION

Many applications that employ video encoding operate on fixed or limited power. Mobile devices such as cellular telephones or sensors, for example, have a fixed amount of total battery power. Much of this fixed amount of battery power may be consumed by video encoding operations, which are some of the most dominant power-consuming operations in wireless video communication. Because much of the available power is consumed by these operations, the amount of time that the devices are capable of operating may be severely limited. As another example, real-time video coding systems require video coding to be completed in a fixed amount of time (e.g., one frame/group of pictures per fixed amount of time/computation). In this case, computationally intensive video coding processes are also inefficient.

Therefore, there is a need in the art for a method and apparatus for complexity-scalable video coding that efficiently allocates computations in video coding process.

SUMMARY OF THE INVENTION

Embodiments of the invention generally provide a method and apparatus for complexity-scalable video coding. One embodiment of a method for video coding includes receiving a sequence of one or more video frames, obtaining a budget for the one or more video frames, the budget specifying a maximum number of computations that may be used in performing motion estimation for the one or more video frames, allocating the maximum number of computations among individual ones of the one or more video frames, performing motion estimation in accordance with the allocating, and outputting a motion estimate for the sequence.

In another embodiment, a computer readable medium contains an executable program for video coding, where the program receives a sequence of one or more video frames, obtains a budget for the one or more video frames, the budget specifying a maximum number of computations that may be used in performing motion estimation for the one or more video frames, allocates the maximum number of computations among individual ones of the one or more video frames, performs motion estimation in accordance with the allocating, and outputs a motion estimate for the sequence.

In another embodiment, a video encoder includes an input for receiving a sequence of one or more video frames and a motion estimator for obtaining a budget for the one or more video frames, the budget specifying a maximum number of computations that may be used in performing motion estimation for the one or more video frames, for allocating the maximum number of computations among individual ones of the one or more video frames, and for performing motion estimation in accordance with the allocating.

BRIEF DESCRIPTION OF THE DRAWINGS

So that the manner in which the above recited embodiments of the invention are attained and can be understood in detail, a more particular description of the invention may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a method and apparatus for complexity-scalable video coding. From the power consumption perspective, the effects of video encoding are two-fold: (1) First, efficient video compression significantly reduces the amount of the video data to be transmitted, which in turn saves a significant amount of energy in data transmission; and (2) Second, more efficient video compression often requires higher computational complexity and larger power consumption in computing. These conflicting effects imply that in practical design, there is always a tradeoff among the bandwidth, power consumption, and video quality. Embodiments of the present invention consider these effects in attempting to efficiently allocate a fixed number of computations (e.g., sum of absolute differences computations or search points) for motion estimation on a sequence of video frames, such that coding performance remains as high as possible.

Although embodiments of the invention are described within the context of video coding, those skilled in the art will appreciate that the invention is not so limited, and may, in fact, have use in substantially any application that requires motion estimation.

Figure 1:
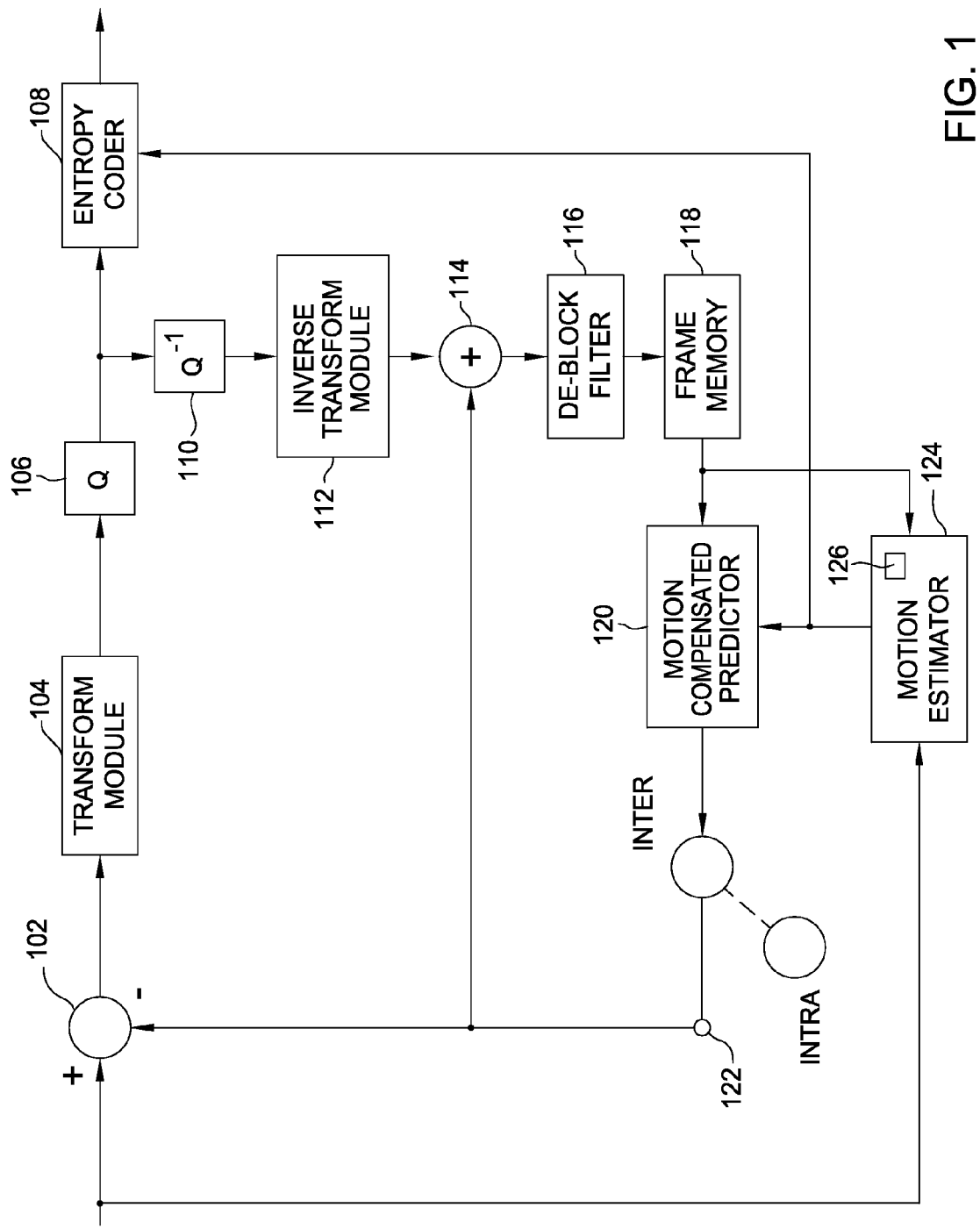
FIG. 1 is a block diagram depicting an exemplary embodiment of a video encoder.

FIG. 1 is a block diagram depicting an exemplary embodiment of a video encoder 100 configured for use according to the present invention. Since FIG. 1 is intended to only provide an illustrative example of an H.264 encoder, FIG. 1 should not be interpreted as limiting the present invention. For example, the video encoder 100 generates a bitstream that is compliant with the H.264 standard, the Moving Picture Experts Group (MPEG)-4, Part 10 standard, or the Advanced Video Coding (AVC) standard. The video encoder 100 may include a subtractor 102, a transform module, e.g., a discrete cosine transform (DCT) like module 104, a quantizer 106, an entropy coder 108, an inverse quantizer 110, an inverse transform module, e.g., an inverse DCT like module 112, a summer 114, a deblocking filter 116, a frame memory 118, a motion compensated predictor 120, an intra/inter switch 122, and a motion estimator 124. It should be noted that although the modules of the encoder 100 are illustrated as separate modules, the present invention is not so limited. In other words, various functions (e.g., transformation and quantization) performed by these modules can be combined into a single module.

In operation, the video encoder 100 receives an input sequence of source frames. The subtractor 102 receives a source frame from the input sequence and a predicted frame from the intra/inter switch 122. The subtractor 102 computes a difference between the source frame and the predicted frame, which is provided to the DCT module 104. In INTER mode, the predicted frame is generated by the motion compensated predictor 120. In INTRA mode, the predicted frame is zero and thus the output of the subtractor 102 is the source frame.

The DCT module 104 transforms the difference signal from the pixel domain to the frequency domain using a DCT algorithm to produce a set of coefficients. The quantizer 106 quantizes the DCT coefficients. The entropy coder 108 codes the quantized DCT coefficients to produce a coded frame.

The inverse quantizer 110 performs the inverse operation of the quantizer 106 to recover the DCT coefficients. The inverse DCT module 112 performs the inverse operation of the DCT module 104 to produce an estimated difference signal. The estimated difference signal is added to the predicted frame by the summer 114 to produce an estimated frame, which is coupled to the deblocking filter 116. The deblocking filter deblocks the estimated frame and stores the estimated frame or reference frame in the frame memory 118. The motion compensated predictor 120 and the motion estimator 124 are coupled to the frame memory 118 and are configured to obtain one or more previously estimated frames (previously coded frames).

The motion estimator 124 also receives the source frame. The motion estimator 124 performs a motion estimation algorithm using the source frame and a previous estimated frame (i.e., reference frame) to produce motion estimation data. For example, the motion estimation data includes motion vectors and minimum sums of absolute differences (SADs) for the macroblocks of the source frame. The motion estimation data is provided to the entropy coder 108 and the motion compensated predictor 120. The entropy coder 108 codes the motion estimation data to produce coded motion data. The motion compensated predictor 120 performs a motion compensation algorithm using a previous estimated frame and the motion estimation data to produce the predicted frame, which is coupled to the intra/inter switch 122. Motion estimation and motion compensation algorithms are well known in the art.

To illustrate, the motion estimator 124 may include mode decision logic 126. The mode decision logic 126 can be configured to select a mode for each macroblock in a predictive (INTER) frame. The "mode" of a macroblock is the partitioning scheme. That is, the mode decision logic 126 selects MODE for each macroblock in a predictive frame, which is defined by values for MB_TYPE and SUB_MB_TYPE.

The above description only provides a brief view of the various complex algorithms that must be executed to provide the encoded bitstreams generated by an H.264 encoder.

Embodiments of the invention estimate a motion vector for a macroblock of a source frame, where the motion vector predicts the position of the macroblock in an estimated frame. The motion vector is estimated by identifying a macroblock in the estimated frame that best matches the macroblock in the source frame and then calculating the displacement (i.e., the difference between the macroblock in the source frame and the macroblock in the estimated frame).

Figure 2:
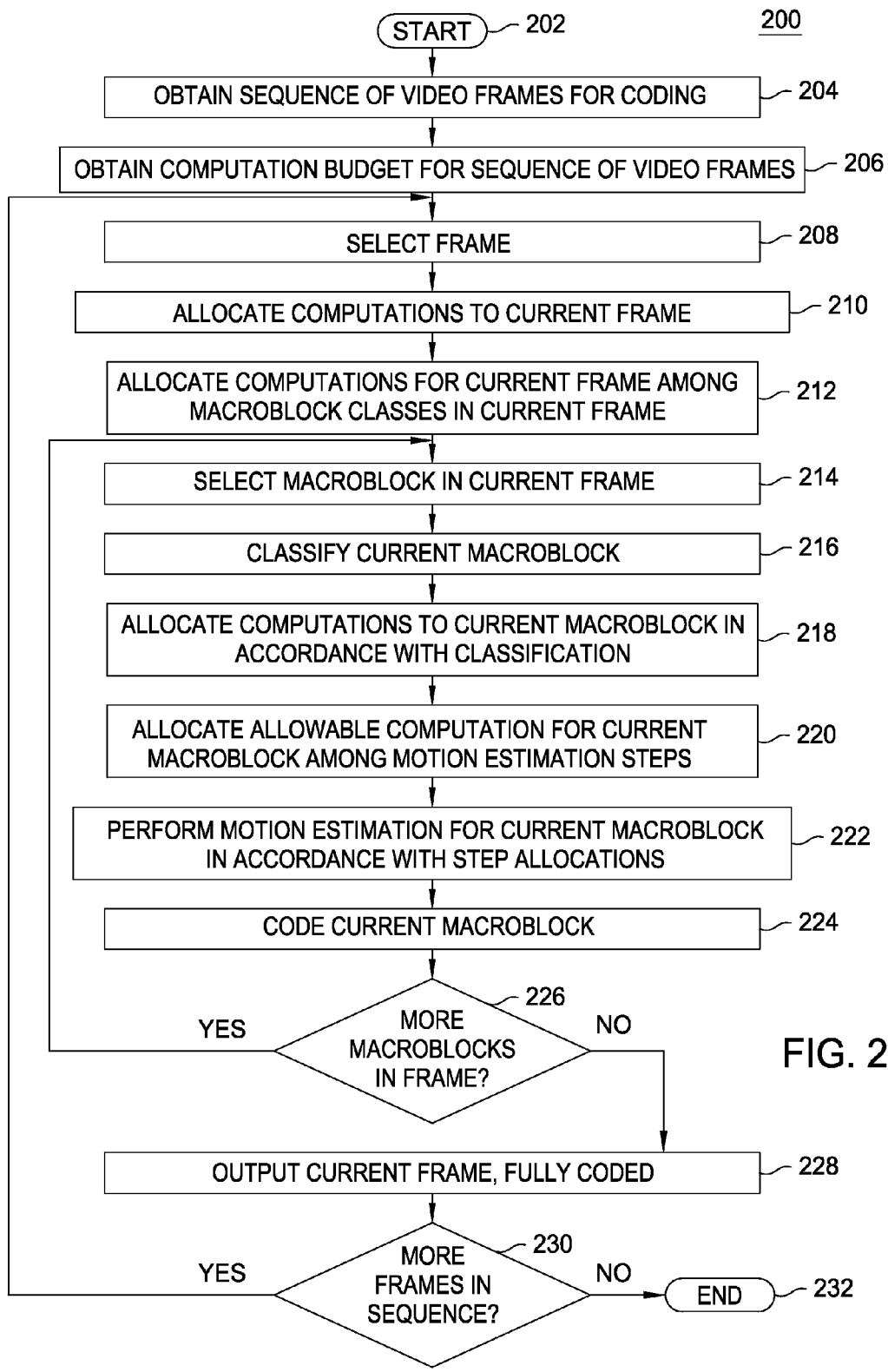
FIG. 2 is a flow diagram illustrating one embodiment of a method for video coding, according to the present invention.

FIG. 2 is a flow diagram illustrating one embodiment of a method 200 for video coding, according to the present invention. The method 200 may be implemented, for example, at the video encoder 100 (and, more specifically, the motion estimator 124 and/or entropy coder 108) of FIG. 1. Notably, in one embodiment the method 200 codes in substantially real-time (i.e., in "one pass"). In other words, a currently selected macroblock is coded substantially immediately.

The method 200 is initialized at step 202 and proceeds to step 204, where the motion estimator obtains a sequence of video frames for encoding. In one embodiment, the sequence of video frames includes at least one frame. In step 206, the motion estimator 200 obtains a complexity target, $C_{Total}$, for the sequence of video frames. The complexity target specifies a maximum number of compare computations (e.g., SAD calculations, search points, or motion cost operations) that may be employed in performing motion estimation for the sequence of video frames. Thus, the complexity target can be considered a computation "budget" for the sequence of video frames.

Once the complexity target has been obtained in accordance with step 206, the method 200 proceeds to step 208, where the motion estimator selects a frame from the sequence of video frames for coding.

In step 210, the motion estimator allocates a portion of the complexity target to the selected frame. In one embodiment, each frame of the sequence of video frames has a minimum (e.g., at least one) computation allocated to it. In one embodiment, to guarantee at least this minimum allocation for each frame, the motion estimator distinguishes between a frame-level base layer and a frame-level enhancement layer.

The computation of the frame-level base layer is the computation for the entire sequence of video frames, which ensures a minimum number of computations (e.g., at least enough to perform a small local search in a simplified hexagon search motion estimation algorithm) for each macroblock in each frame. If a simplified hexagon search algorithm is employed, a small local search for each macroblock requires six search points; thus, six computations per macroblock is the minimum number of computations allocated to each macroblock. Thus, the frame-level base layer, FL-BL, can be defined as:

$$B_{FL\text{-}BL} = \alpha \cdot N_{MB\_per\_frame} \cdot N_{Frames\_whole\_sequence} \quad \text{(EQN. 1)}$$

where $\alpha$ is a minimum number of computations allocated to each macroblock (e.g., in the case of small local search, six computations for each macroblock), $N_{MB\_per\_frame}$ is the total number of macroblocks in each frame and $N_{Frames\_whole\_sequence}$ is the total number of frames in the entire sequence of video frames.

The computation of the frame-level enhancement layer is the difference between the complexity target and the frame-level base layer. Thus, the frame-level enhancement layer, FL-EL, can be defined as:

$$E_{FL\text{-}EL} = E_{Total\_Left} = C_{Total} - B_{FL\text{-}BL} \quad \text{(EQN. 2)}$$

In one embodiment, the motion estimator allocates the complexity target among the enhancement layer only, according to the following:

$$C_{Cur\_frame}^{Allocate} = \quad \text{(EQN. 3)}$$

$$\begin{cases} B_{frame} + \dfrac{E_{Total\_Left}}{N_{Total\_Frames\_Left}} & \text{if } C_{pre\_frame}^{Actual} \leq C_{T1} \\ B_{frame} + \dfrac{E_{Total\_Left}}{N_{Total\_Frames\_Left}} \cdot \dfrac{C_{T1}}{C_{pre\_frame}^{Actual}} & \text{if } C_{pre\_frame}^{Actual} > C_{T1} \end{cases}$$

where when processing the first temporally predicted frame of a sequence (i.e., when there is no value for (i.e., when there is no value for $C_{pre\_frame}^{Actual}$), the top condition can be assumed, and where $$C_{Cur\_frame}^{Allocate}$$

is the portion of the total complexity target that is allocated to a current frame, $E_{Total\_Left}$ is the total number of enhancement layer computations remaining before coding the current frame (the value of $E_{Total\_Left}$ upon coding the first temporally predicted frame of the sequence is $E_{FL\text{-}EL}$), $N_{Total\_Frames\_Left}$ is the total number of frames remaining before coding the current frame, $$C_{pre\_frame}^{Actual}$$

is the total number of computations actually used in the previous frame, and $B_{frame}$ is the base layer computation for each frame. These values are computed as:

$$C_{T1} = B_{frame} + \frac{E_{Total\_Left}}{N_{Total\_Frames\_Left}} \quad \text{(EQN. 4)}$$

$$B_{frame} = \alpha \cdot N_{MB\_per\_frame} = \frac{B_{FL\text{-}BL}}{N_{Frames\_whole\_sequence}} \quad \text{(EQN. 5)}$$

$$E_{Total\_Left}^{Current} = E_{Total\_Left} - (C_{pre\_frame}^{Actual} - B_{frame}) \quad \text{(EQN. 6)}$$

$$C_{pre\_frame}^{Actual} \leq C_{T1}$$

indicates that there are enough computations left to allocate, while $$C_{pre\_frame}^{Actual} > C_{T1}$$

indicates that there are not enough computations left to allocate. When the next frame in the sequence is coded, the value for $$E_{Total\_Left}^{Current}$$

becomes the new value for $E_{Total\_Left}$ in EQN. 3.

Thus, in order to allocate the complexity target among the frames in the sequence of video frames in accordance with step 210, the motion estimator first divides the total number of computations left in the enhancement layer ($E_{Total\_Left}$) by the total number of frames left ($N_{Total\_Frames\_Left}$). The difference is the average number of computations for the enhancement layer computation remaining for each frame. The actual number of computations used in the previous frame $$(C_{pre\_frame}^{Actual})$$

then compared with the average available computation per frame ($C_{T1}$). If there are enough computations left to allocate $$(i.e., C_{pre\_frame}^{Actual} \leq C_{T1}),$$

then the average number of computations for the enhancement layer computation remaining for each frame is added to the base layer ($B_{frame}$) for the current frame, and the total is the number of computations allocated to the current frame.

However, if the previous computation has exceeded the number of computations allocated $$(i.e., C_{pre\_frame}^{Actual} > C_{T1}),$$

then it is assumed that the frames occurring before and after the current frame may use more than their allocated computations. Thus, if allocations continue to be made without interference, too many computations may be allocated to the current frame (e.g., such that all of the computations may be allocated before the end of the sequence of frames is reached). In one embodiment, a pre-scaling step is performed on the allocated enhancement layer in order to ensure that computations are saved for allocation to future frames.

In step 212, the motion estimator allocates, for the current (selected) frame, the computations allocated to that frame among the classes of macroblocks in the frame. For example, if X computations have been allocated to the current frame, the motion estimator allocates the X computations among the macroblock classes existing in the current frame. In one embodiment, the macroblocks are classified into one of three classes (i.e., class 1, class 2, and class 3) for the purposes of motion estimation. In one embodiment, the methods discussed in U.S. patent Ser. No. 12/209,173, filed Sep. 11, 2008, which is herein incorporated by reference in its entirety, are used to classify the macroblocks.

In one embodiment, the computations are allocated among the classes of macroblocks in accordance with either a "loose" allocation strategy or a "tight" allocation strategy. In accordance with the loose allocation strategy, the actual number of computations used for the current frame can exceed the number of computations allocated for the current frame; in accordance with the tight allocation strategy, the actual number of computations used for the current frame must be less than or equal to the number of computations allocated for the current frame.

The loose allocation strategy therefore allows borrowing of computations from other frames, as long as the total number of computations for the entire sequence of video frames does not exceed the target complexity (i.e., the total number of computations allocated to the entire sequence of video frames). In one embodiment, the loose allocation strategy allocates computations among classes of macroblocks in the current frame according to the following:

$$C_{class1\_Cur\_F}^{allocated} = \alpha \cdot N_{class1}^{pre\_Frame} \quad \text{(EQN. 7)}$$

$$C_{class2\_Cur\_F}^{allocated} = \min\left(C_{class2,class3}^{allocated} \cdot \frac{C_{class2\_pre}^{actual}}{C_{class2\_pre}^{actual} + C_{class3\_pre}^{actual}}, \beta \cdot N_{class2}^{pre\_Frame}\right) \quad (\text{EQN. 8})$$

$$C_{class3\_Cur\_F}^{allocated} = C_{class2,class3}^{allocated} - C_{class2\_Cur\_F}^{allocated} \quad (\text{EQN. 9})$$

where $\alpha$ is a minimum number of computations allocated to each macroblock (e.g., in the case of a small local search, six computations for each macroblock), $\beta$ is the maximum number of computations that can be allocated to a class 2 macroblock, $$C_{class2,class3}^{allocated} = C_{Cur\_Frame}^{allocated} - C_{class1\_Cur\_F}^{allocated}, C_{Cur\_Frame}^{allocated}$$

is the total number of computations allocated to the current frame, $$N_{classi}^{pre\_Frame}$$

is the number of class i macroblocks in the previous frame, $$C_{classi\_Cur\_F}^{allocated}$$

is the number of computations allocated to class i macroblocks in the current frame, and $$C_{classi\_pre}^{actual}$$

is the number of computations actually used for class i macroblocks in the previous frame. In one embodiment, $\beta$ is set to the value of two hundred.

In one embodiment, computations are first allocated to class 1 macroblocks $$(\alpha \cdot N_{class1}^{pre\_Frame}),$$

in order to ensure that at least a minimum number $\alpha$ of computations are allocated to each class 1 macroblock (e.g., at least enough computations to perform a small local search for the macroblock in a simplified hexagon search). Since the number of class 1 macroblocks in the current frame is unknown, the allocation is based on the number of class 1 macroblocks in the previous frame $$(N_{class1}^{pre\_Frame}),$$

which is multiplied by the minimum number of computations (e.g., in the case of a small local search, six search points or computations are required for each macroblock).

$$C_{class2,class3}^{allocated}$$

is thus the number of computations allocated cumulatively to class 2 and 3 macroblocks of the current frame. In one embodiment, $$C_{class2,class3}^{allocated}$$

is split among class 2 and class 3 macroblocks based on the ratio of actual computations used for class 2 and class 3 macroblocks in the previous frame. In one embodiment, in order to reduce the occurrence of over-allocation to class 2 macroblocks, a maximum number of computations that can be allocated to class 2 macroblocks of the current frame is set to $$(\beta \cdot N_{class2}^{pre\_Frame})$$

(where $\beta$ represents the maximum number of computations that can be allocated to a class 2 macroblock; in the case of a simplified hexagon search, the maximum number of search points within a search range). In one embodiment, any computations beyond the maximum number that are allocated to a class of macroblocks will not be performed.

Having allocated computations for the current frame among the classes of macroblocks in that frame, the method 200 proceeds to step 214, where the motion estimator selects a macroblock in the current frame. The motion estimator then classifies the current (selected) marcoblock in step 216. In one embodiment, the current macroblock is classified in one of class 1, class 2, and class 3, as referenced above.

In step 218, the motion estimator allocates a number of computations to the current macroblock, based on the number of computations available to the class in which the current macroblock is classified. For example, if Y computations have been allocated for class 1 macroblocks, and the current macroblock is a class 1 macroblock, the motion estimator allocates at least a portion of the Y computations to the current macroblock.

In accordance with the "loose" allocation strategy described above for class-level allocations, macroblock-level allocations are in one embodiment made according to the following: For class 1 macroblocks, each class 1 macroblock is allocated a minimum number a of computations (e.g., the minimum number required of computations required for a small local search; in the case of a simplified hexagon search, six search points).

For class 2 macroblocks, the number of computations, $$C_{Cur\_class2\_MB}^{Allocated},$$

allocated to each class 2 macroblock is defined as:

$$C_{Cur\_class2\_MB}^{Allocated} = \max\left(\frac{\text{Init\_MC}_{Cur\_Class2\_MB}}{\text{Avg\_Init\_MC}_{Coded\_MB}^{Class2}} \cdot \frac{C_{Class2}^{Left}}{N_{Class2\_pre}^{Left}}, \gamma\right) \quad (\text{EQN. 10})$$

where γ is the minimum number of computations that is allocated to a single class 2 macroblock, and where $$\text{Avg\_Init\_MC}_{Coded\_MB}^{Class2} = \frac{\sum_{\substack{i \in CodedClass2MB \\ inCurFrame}} \text{Init\_MC}_i^{class2}}{N_{CodedMB}^{Class2}} \quad \text{(EQN. 11)}$$

$$C_{Class2}^{Left} = C_{Class2\_Cur\_F}^{Allocated} - \sum_{\substack{i \in CodedClass2MB \\ inCurFrame}} C_{i\_Class2\_MB}^{Actual} \quad \text{(EQN. 12)}$$

$$N_{Class2\_pre}^{Left} = \max(N_{Class2\_pre\_F}^{Total} - N_{CodedMB}^{Class2}, 1) \quad \text{(EQN. 13)}$$

In one embodiment, γ is set to the value of twenty-five.

For class 3 macroblocks, the number of computations, $$C_{Cur\_class3\_MB}^{Allocated},$$

allocated to each class 3 macroblock is defined as:

$$C_{Cur\_class3\_MB}^{Allocated} = \max\left(\frac{\text{Init\_MC}_{Cur\_Class3\_MB}}{\text{Avg\_Init\_MC}_{Coded\_MB}^{Class3}} \cdot \frac{C_{Class3}^{Left}}{N_{Class3\_pre}^{Left}}, \alpha\right) \quad \text{(EQN. 14)}$$

where α is a minimum number of computations allocated to each macroblock (e.g., in the case of a small local search, six computations for each macroblock), and where $$\text{Avg\_Init\_MC}_{Coded\_MB}^{Class3} = \sum_{\substack{i \in CodedClass3MB \\ inCurFrame}} \text{Init\_MC}_i^{class3} \quad \text{(EQN. 15)}$$

$$C_{Class3}^{Left} = C_{Class3\_Cur\_F}^{Allocated} - \sum_{\substack{i \in CodedClass3MB \\ inCurFrame}} C_{i\_Class3\_MB}^{Actual} \quad \text{(EQN. 16)}$$

$$N_{Class3\_pre}^{Left} = \max(N_{Class3\_pre\_F}^{Total} - N_{CodedMB}^{Class3}, 1) \quad \text{(EQN. 17)}$$

where $\text{Init\_MC}_{Cur\_Classi\_MB}$ is the initial matching cost of the current class i macroblock (e.g., as defined by Ser. No. 12/209,173, $$\text{Avg\_Init\_MC}_{Coded\_MB}^{Classi}$$

is the average matching cost for coded class i macroblocks in the current frame, $C_{Classi}^{Left}$ is the number of computations remaining for allocation to class i macroblocks before coding of the current macroblock, $$N_{CodedMB}^{Classi}$$

is the number of coded class i macroblocks in the current frame, and $$C_{j\_Class\_i\_MB}^{Actual}$$

is the actual computation used for the current j macroblock in class i macroblocks.

Thus, class 2 and class 3 macroblocks are treated similarly in terms of making allocations from their respective computation budgets. If a macroblock is classified in class 2 or class 3, the average available computations in the current class budget can be calculated as $$\left(\frac{C_{Class}^{Left}}{N_{Class\_pre}^{Left}}\right),$$

where the number of class 2 or class 3 macroblocks in the previous frame is used as a global view variable to predict the total number of class 2 or class 3 macroblocks in the current frame. The average available computations are then scaled by the ratio between the current initial matching cost and the average initial matching cost of coded same-class macroblocks in the current frame. The scaled value is the number of computations allocated to the current macroblock. In one embodiment, since Ser. No. 12/209,173 identifies class 2 macroblocks as being more important than class 3 macroblocks, each class 2 macroblock is allocated at least a minimum number γ of computations (e.g., twenty-five in the case of a simplified hexagon search), in order to prevent the number of allocated computations from being scaled to a number that is too small. In a further embodiment, class 3 macroblocks are allocated at least a minimum number α of computations (e.g., enough for a small local search).

As discussed above, steps 212-218 could be performed in accordance with a "loose" allocation strategy, described above. Alternatively, steps 212-218 could be performed in accordance with a "tight" allocation strategy. In accordance with a tight allocation strategy, computations are allocated among the classes of macroblocks (e.g., in accordance with step 212) in the current frame based on an "under-frame-layer base layer" and an "under-frame-layer enhancement layer." Computation allocations $$C_{Base\_layer}^{Under\_Frame}$$

are made to the under-frame-layer base layer as follows:

$$C_{Base\_layer}^{Under\_Frame} = \alpha \cdot (N_{Class1}^{pre} + N_{Class3}^{pre}) + \alpha' \cdot N_{Class2}^{pre} \quad \text{(EQN. 18)}$$

where $$\alpha' = \begin{cases} \gamma & \text{if } C_{Cur\_F}^{Allocated} \geq \alpha \cdot (N_{Class1}^{pre} + N_{Class3}^{pre}) + \gamma \cdot N_{Class2}^{pre} \\ \alpha & \text{if } C_{Cur\_F}^{Allocated} < \alpha \cdot (N_{Class1}^{pre} + N_{Class3}^{pre}) + \gamma \cdot N_{Class2}^{pre} \end{cases}$$

where α' is a minimum number of computations to be allocated to the current class 2 macroblock and can take on the value of γ if the top condition in EQN. 18 is satisfied (i.e., there is enough computation to be allocated), or the value of α if the bottom condition in EQN. 18 is satisfied (i.e., not enough computation for additional allocation, hence use the same allocation as class 1 and 3).

Computation allocations $$C_{Enhancement\_layer}^{Under\_Frame}$$

are made to the under-frame-layer base layer as follows:

$$C_{Enhancement\_layer}^{Under\_Frame} = \max(0, C_{Cur\_F}^{Allocated} - C_{Base\_layer}^{Under\_Frame}) \quad (EQN.\ 19)$$

Thus, if there are enough remaining computations allocated to the current frame, the under-frame-layer base layer is set so that each class 1 and class 3 macroblock will be allocated at least a first minimum number of computations (e.g., enough computations for a small local search), while each class 2 macroblock is allocated at least a second minimum number of computations. If the minimum number of computations cannot be allocated, then each macroblock is allocated at least enough a third minimum number of computations (e.g., to perform a small local search). When allocating more computations for the under-frame-layer base layer for class 2 macroblocks, the method 200 attempts to ensure motion estimation for the most important class of macroblocks (e.g., as defined by Ser. No. 12/209,173.

The step of allocating computations among the classes of macroblocks in accordance with a tight allocation strategy can be summarized as follows:

$$E_{Class1\_Cur\_F}^{allocated} = 0 \quad (EQN.\ 20)$$

$$E_{Class2\_Cur\_F}^{allocated} = \min\left(E_{class2,class3}^{allocated} \cdot \frac{C_{class2\_pre}^{actual}}{C_{class2\_pre}^{actual} + C_{class3\_pre}^{actual}}, \delta \cdot N_{class2}^{pre\_Frame}\right) \quad (EQN.\ 21)$$

$$E_{Class3\_Cur\_F}^{allocated} = E_{class2,class3}^{allocated} - E_{Class2\_Cur\_F}^{allocated} \quad (EQN.\ 22)$$

where δ is the maximum number of computations in the enhancement layer that can be allocated to a class 2 macroblock, and where $$E_{class2,class3}^{allocated} = \quad (EQN.\ 23)$$
$$C_{Enhancement\_layer}^{Under\_Frame} = \max(0, C_{Cur\_F}^{Allocated} - C_{Base\_layer}^{Under\_Frame})$$

In one embodiment, δ is set to the value of one hundred seventy-five.

Thus, class-level allocation in accordance with the tight allocation strategy is similar to allocation in accordance with the loose allocation strategy, except that the allocation in the tight allocation strategy case is based on the enhancement layer (i.e., the enhancement layer computations E in EQNs. 20-22 take the place of the total computations C in EQNs. 7-9). Since a base layer was already allocated for class 1 macroblocks, no enhancement layer computations are allocated to class 1 macroblocks.

In accordance with a tight allocation strategy, computations are allocated among the actual macroblocks (e.g., in accordance with step 218) as follows. For class 1 macroblocks, at least the first minimum number of computations is allocated (e.g., enough computations for a small local search). For class 2 macroblocks, the number of computations, $$C_{Cur\_Class2MB}^{Allocated},$$

allocated to a current class 2 macroblock is:

$$C_{Cur\_Class2MB}^{Allocated} = \quad (EQN.\ 24)$$

$$\begin{cases} \max\left(\frac{\text{Init\_MC}_{CurClass2MB}}{\text{Avg\_Init\_MC}_{CodedMB}^{Class2}} \cdot \frac{E_{Class2}^{Left}}{N_{Class2\_pre}^{Left}}, 0\right) + \alpha' \\ \alpha \end{cases}$$

if $E_{Class2}^{Left} > 0$ and $N_{Class2\_pre}^{Left} > 1$ if $E_{Class2}^{Left} \leq 0$ or $N_{Class2\_pre}^{Left} \leq 1$ where α' is a minimum number of per-macroblock computations that in one embodiment equals γ or α depending on its value in EQN. 18, and where $$\text{Avg\_Init\_MC}_{CodedMB}^{Class2} = \frac{\sum_{\substack{i \in CodedClass2MB \\ inCurFrame}} \text{Init\_MC}_i^{Class2}}{N_{CodedMB}^{Class2}} \quad (EQN.\ 25)$$

$$E_{Class2}^{Left} = E_{Class2\_Cur\_F}^{Allocated} - \sum_{\substack{i \in CodedClass2MB \\ inCurFrame}} E_{i\_Class2\_MB}^{Actual} \quad (EQN.\ 26)$$

$$N_{Class2\_pre}^{Left} = \max(N_{Class2\_pre\_F}^{Total} - N_{CodedMB}^{Class2}, 1) \quad (EQN.\ 27)$$

where if $$E_{Class2}^{Left} > 0$$

and $$N_{Class2\_pre}^{Left} > 1,$$

there are still computations left in the enhancement layer, but if $$E_{Class2}^{Left} \leq 0$$

or $$N_{Class2\_pre}^{Left} \leq 1,$$

there are no computations left in the enhancement layer, and a local search only is performed for the macroblock.

For class 3 macroblocks, the number of computations, $$C_{Cur\_Class3MB}^{Allocated},$$

allocated to a current class 3 macroblock is:

$$C_{Cur\_Class3MB}^{Allocated} = \max\left(\frac{\text{Init\_MC}_{CurClass3MB}}{\text{Avg\_Init\_MC}_{CodedMB}^{Class3}} \cdot \frac{E_{Class3}^{Left}}{N_{Class3\_pre}^{Left}}, 0\right) + \alpha \quad 5$$

where $\alpha$ is a minimum number of computations allocated to each macroblock (e.g., in the case of a small local search, six computations for each macroblock), and where $$\text{Avg\_Init\_MC}_{CodedMB}^{Class3} = \sum_{\substack{i \in CodedClass3MB \\ inCurFrame}} \text{Init\_MC}_i^{Class3} \quad \text{(EQN. 29)}$$

$$E_{Class3}^{Left} = E_{Class3\_Cur\_F}^{Allocated} - \sum_{\substack{i \in CodedClass3MB \\ inCurFrame}} E_{i\_Class3\_MB}^{Actual} \quad \text{(EQN. 30)}$$

$$N_{Class3\_pre}^{Left} = \max(N_{Class3\_pre\_F}^{Total} - N_{CodedMB}^{Class3}, 1) \quad \text{(EQN. 31)}$$

The macroblock-level allocation (i.e., step 218) for the tight allocation strategy is similar to the macroblock-level allocation for the loose allocation strategy. There are three main differences when applying the tight allocation strategy. First, allocation and scaling from the class budget is based only on the enhancement layer when applying the tight allocation strategy. Second, after a class's enhancement layer computations are allocated to a current macroblock in accordance with the tight allocation strategy, the under-frame-layer base level is then added to produce the entire computation budget for the macroblock. Third, for class 2 macroblocks processed in accordance with the tight allocation strategy, if the under-frame-layer enhancement layer has already been exhausted, the rest of the class 2 macroblocks in the frame will only be allocated enough computations for a small local search, in order to prevent the total number of computations allocated to the frame from exceeding what was allocated.

Once the current macroblock has been allocated a number of computations as described above, the method 200 proceeds to step 220, where the motion estimator allocates the computations allocated to the current macroblock among individual steps of the motion estimation process (e.g., for a simplified hexagon search: small local search, cross search, multi-hex search, small hex search, small diamond search, etc., as referenced in Ser. No. 12/209,173.

In one embodiment, computations are allocated to the individual steps of the motion estimation process as follows:

$$C_{Local\_Search} = 4 \quad \text{(EQN. 32)}$$

$$C_{Cross\_Search} = \text{int}\left[\frac{0.32 \cdot C_{Cur\_Class\_MB}^{Allocated}}{4}\right] \cdot 4 \quad \text{(EQN. 33)}$$

$$C_{Multi\_Hex\_Search} = \text{int}\left[\frac{0.64 \cdot C_{Cur\_Class\_MB}^{Allocated}}{16}\right] \cdot 16 \quad \text{(EQN. 34)}$$

$$C_{Small\_Hex\_Search} = \begin{cases} C_{Cur\_Class\_MB}^{Allocated} - C_{prior\_seraches} \text{ if} \\ (\text{Circle}_{Cross\_Search} + \text{Circle}_{Multi\_Hex\_Search}) > 1 \\ 0 \text{ if } (\text{Circle}_{Cross\_Search} + \text{Circle}_{Multi\_Hex\_Search}) \leq 1 \end{cases}$$

where int[x] is the integer part of x, and where $$C_{prior\_searches} = C_{Local\_Search} + C_{Cross\_Search} + C_{Multi\_Hex\_Search} \quad \text{(EQN. 35)}$$

$$C_{Small\_Diamond\_Search} = \quad \text{(EQN. 36)}$$
$$\begin{cases} C_{Cur\_Class\_MB}^{Allocated} - C'_{prior\_searches} \text{ if } \text{Circle}_{Cross\_Search} > 1 \\ 0 \text{ if } \text{Circle}_{Cross\_Search} \leq 1 \end{cases}$$

where $$C'_{prior\_searches} = C_{Local\_Search} + C_{Cross\_Search} + C_{Multi\_Hex\_Search} + C_{Small\_Hex\_Search}^{Actual}$$

and where $$\text{Circle}_{Cross\_Search} = \left[\frac{0.32 \cdot C_{Cur\_Class\_MB}^{Allocated}}{4}\right] \quad \text{(EQN. 37)}$$

$$\text{Circle}_{Multi\_Hex\_Search} = \left[\frac{0.64 \cdot C_{Cur\_Class\_MB}^{Allocated}}{16}\right] \quad \text{(EQN. 38)}$$

and where $$C_{Small\_Hex\_Search}^{Actual}$$

is the actual computation used in the small hex search.

In one embodiment, the step-level allocation process of step 220 always allocates at least four computations for a small local search. Next, thirty-two percent of the computations are allocated to a cross search, and sixty-four percent of the computations are allocated to a multi-hex search. If the cross search and multi-hex search have been allocated their respective computations and the total computations allocated to the current macroblock have not been exhausted, computations are allocated to the small hex search and the small diamond search follow. If no allocated computations remain after the cross search and multi-hex search have been allocated their respective computations, the small hex search and the small diamond search receive no computations (i.e., are skipped when motion estimation is performed). In this manner, the computations can be scaled down to only small local searches with only six computations.

In step 222, the motion estimator performs motion estimation for the current macroblock in accordance with the step allocations made in step 220. The motion estimator then codes the current macroblock in step 224. Alternatively, motion estimator may output a motion vector for the current macroblock to an entropy coder, which then codes the current macroblock in accordance with the motion vector.

In step 226, the motion estimator determines whether there are any macroblocks remaining to be coded in the current frame. If the motion estimator determines in step 226 that there is at least one macroblock remaining to be coded in the current frame, the method 200 returns to step 214, where the motion estimator selects a next macroblock of the current frame and proceeds as described above to perform motion estimation and coding.

Alternatively, if the motion estimator determines in step 226 that there are no macroblocks remaining to be coded in the current frame, the method 200 proceeds to step 228, where the motion estimator outputs the current frame, fully coded. Alternatively, the motion estimator may output a motion vector for the current frame to an entropy coder, which then codes the current frame in accordance with the motion vector and outputs the fully coded frame. The method 200 then proceeds to step 230, where the motion estimator determines whether there are any frames remaining to be coded in the sequence of video frames. If the motion estimator determines in step 230 that there is at least one frame remaining to be coded in the current frame, the method 200 returns to step 208, where the motion estimator selects a next frame of the sequence of video frames and proceeds as described above to perform motion estimation and coding.

Alternatively, if the motion estimator determines in step 230 that there are no frames remaining to be coded in the sequence of video frames, the method terminates in step 232.

Figure 3:
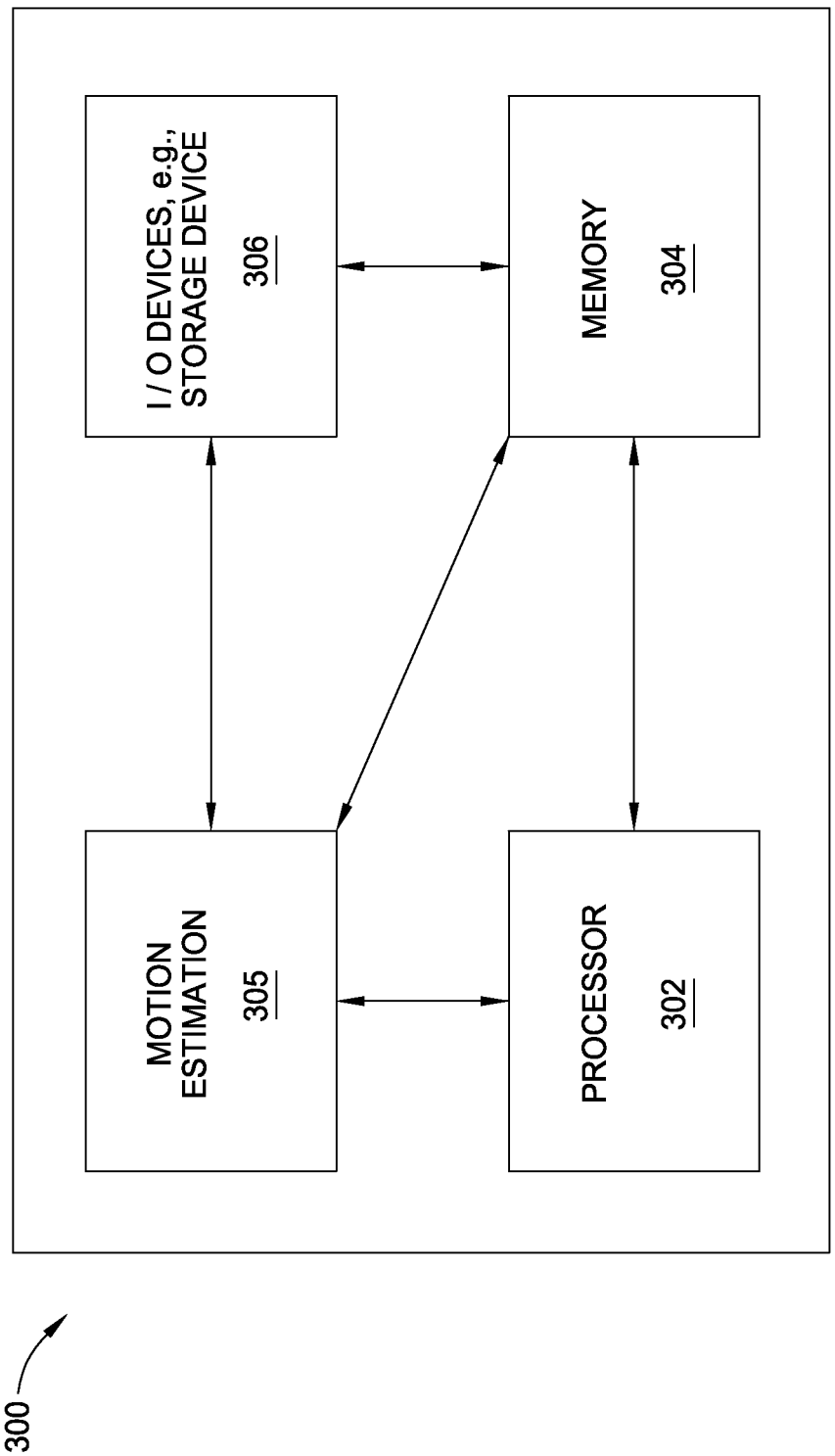
FIG. 3 is a high level block diagram of the present video coding method that is implemented using a general purpose computing device.

FIG. 3 is a high level block diagram of the present motion estimation method that is implemented using a general purpose computing device 300. In one embodiment, a general purpose computing device 300 comprises a processor 302, a memory 304, a motion estimation module 305 and various input/output (I/O) devices 306 such as a display, a keyboard, a mouse, a modem, a microphone, a speaker, a network connection and the like. In one embodiment, at least one I/O device is a storage device (e.g., a disk drive, flash memory, an optical disk drive, a floppy disk drive). It should be understood that the motion estimation module 305 can be implemented as a physical device or subsystem that is coupled to a processor through a communication channel.

Alternatively, the motion estimation module 305 can be represented by one or more software applications (or even a combination of software and hardware, e.g., using Application-Specific Integrated Circuits (ASIC)), where the software is loaded from a storage medium (e.g., I/O devices 306) and operated by the processor 302 in the memory 304 of the general purpose computing device 300. Additionally, the software may run in a distributed or partitioned fashion on two or more computing devices similar to the general purpose computing device 300. Thus, in one embodiment, the motion estimation module 305 for improving the efficiency of video encoder processes described herein with reference to the preceding figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Thus, the present invention represents a significant advancement in the field of motion estimation. Embodiments of the present invention efficiently allocate a fixed number of computations (e.g., sum of absolute differences computations, search points, or motion cost operations) for motion estimation on a sequence of video frames, such that coding performance remains as high as possible.

While the foregoing is directed to embodiments of the invention, other and further embodiments of the invention may be devised without departing from the basic scope thereof.

What is claimed is:

1. A method for video coding, comprising:
receiving a sequence of N video frames, each video frame containing macroblocks, where N is an integer greater than two;
obtaining a budget for the N video frames, the budget specifying a maximum number of computations, $C_{Total}$, that may be used in performing motion estimation for the N video frames;
determining in a single pass through the N video frames a video frame allocation for each video frame such that the sum of the video frame allocations approaches $C_{Total}$ as the video frame allocations for more video frames are determined during the single pass through the N video frames, wherein the video frame allocation further comprises:
allocating a number of computations allocated to a class of the macroblocks among individual macroblocks in the class of macroblocks; and
allocating a number of computations allocated to an individual macroblock among individual steps of a motion estimation process;
performing motion estimation for each video frame during the single pass through the N video frames using an actual number of video frame computations that is determined based at least upon on the video frame allocation and one or more classes of the macroblocks contained in the video frame, wherein the class of each macroblock is based upon at least one motion vector related to the macroblock; and
coding each video frame in accordance with the motion estimation during the single pass through the N video frames and outputting each coded video frame.

2. The method of claim 1, wherein the computations are sum of absolute differences computations, search points, or motion cost operations.

3. The method of claim 1, wherein the video frame allocation is determined such that each of the N video frames is allocated at least a minimum number of the computations.

4. The method of claim 1, wherein the one or more classes of macroblocks comprises three classes.

5. The method of claim 1, wherein the video frame allocation for one video frame of the N video frames is used to determine a class allocation among the one or more classes of macroblocks of the one video frame such that the actual number of video frame computations allocated by the class allocations to all of the macroblocks of the one video frame exceeds the video frame allocation.

6. The method of claim 5, wherein a difference between the video frame allocation for the one video frame and the actual number of video frame computations for the one frame is borrowed from video frame allocations for one or more others of the N video frames.

7. The method of claim 1, wherein the video frame allocation for one video frame of the N video frames is used to determine an actual allocation among the one or more classes of macroblocks of the one video frame such that the actual number of video frame computations allocated to macroblocks of the one video frame is less than or equal to the video frame allocation.

8. The method of claim 1, wherein the individual steps of the motion estimation process comprise at least one of: a small local search step, a cross search step, a multi-hex search, a small hex search and a small diamond search.

9. The method of claim 1, wherein the allocating further comprises:

allocating a number of computations allocated to one of the N video frames among individual macroblocks in the one of the N video frames.

10. The method of claim 8, wherein at least a minimum number of computations are allocated to the small local search step.

11. A non-transitory computer readable medium containing an executable program for video coding, where the program performs the steps of:
   receiving a sequence of N video frames, each video frame containing macroblocks, where N is an integer greater than two;
   obtaining a budget for the N video frames, the budget specifying a maximum number of computations, $C_{Total}$, that may be used in performing motion estimation for the N video frames;
   determining in a single pass through the N video frames a video frame allocation for each video frame such that the sum of the video frame allocations approaches $C_{Total}$ as the video frame allocations for more video frames are made during the single pass through the N video frames, wherein the video frame allocation further comprises:
      allocating a number of computations allocated to a class of the macroblocks among individual macroblocks in the class of macroblocks; and
      allocating a number of computations allocated to an individual macroblock among individual steps of a motion estimation process; and
   performing motion estimation for each video frame during the single pass through the N video frames using an actual number of video frame computations that is determined based at least on the video frame allocation and one or more classes of the macroblocks contained in the video frame, wherein the class of a macroblock of a macroblock is based upon at least one motion vector related to the macroblock; and
   coding each video frame in accordance with the motion estimation during the single pass through the N video frames and outputting each coded video frame.

12. A video encoder, comprising:
   an input for receiving a sequence of N video frames, each video frame containing macroblocks, where N is an integer greater than two; and
   a motion estimator for
      obtaining a budget for the N video frames, the budget specifying a maximum number of computations, $C_{Total}$, that may be used in performing motion estimation for the N video frames;
   determining in a single pass through the N video frames an allocation for each video frame such that the sum of the allocations approaches $C_{Total}$ as the allocations for more video frames are made during the single pass through the N video frames, wherein the video frame allocation further comprises:
      allocating a number of computations allocated to a class of the macroblocks among individual macroblocks in the class of macroblocks; and
      allocating a number of computations allocated to an individual macroblock among individual steps of a motion estimation process; and
   performing motion estimation for each video frame during the single pass through the N video frames using an actual number of computations that is based at least on the allocation and one or more classes of the macroblocks contained in the video frame, wherein the class of a macroblock is based upon at least one motion vector related to the macroblock; and
   coding each video frame in accordance with the motion estimation during the single pass through the N video frames and outputting each coded frame.

13. The video encoder of claim 12, wherein the video encoder generates a bitstream that is compliant with at least one of: the H.264 standard, the Moving Picture Experts Group (MPEG)-4, Part 10 standard, or the Advanced Video Coding (AVC) standard.

14. The method according to claim 1, wherein the determination of video frame allocation comprises:
   determining an average number of remaining computations, $C_{T1}$, by dividing a remaining number of computations by a remaining number of video frames for which motion estimation has not been performed, $N_{Total\_Frames\_left}$, and
   modifying the video frame allocation to a value that is less than $C_{T1}$ when the actual number of video frame computations used for a previous video frame is greater than the $C_{T1}$.

15. The method according to claim 14, wherein when the actual number of video frame computations used for a previous video frame is greater than the $C_{T1}$, the video frame allocation is determined as:

$$\text{Allocation} = B_{frame} + \frac{E_{Total\_Left}}{N_{Total\_Frames\_Left}} \cdot \frac{E_{Ave\_Rem}}{C_{pre\_frame}^{Actual}},$$

wherein $B_{frame}$ is a constant that is a minimum number of computations for each video frame, $$E_{Totasl\_Left} = C_{Total} - \sum_{PreviousFrames} C_{pre\_frames}^{Actual} - N_{Total\_Frames\_Left} * B_{frame},$$

wherein the summation term is the sum of the actual computations used for all the video frames for which motion estimation has been determined, and $$C_{pre\_frame}^{Actual}$$

is the actual computations used for the previous video frame.

16. The method according to claim 1, wherein the actual number of video frame computations used for all video frames is less than $C_{Total}$.

* * * * *